United States Patent
Hendricks

(10) Patent No.: US 7,420,875 B1
(45) Date of Patent: Sep. 2, 2008

(54) METHODS AND SYSTEMS FOR USE OF AN ACOUSTIC DOPPLER CURRENT PROFILER FOR MEASUREMENT OF COMPACT JETS

(75) Inventor: Peter J. Hendricks, Portsmouth, RI (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 0 days.

(21) Appl. No.: 11/767,658

(22) Filed: Jun. 25, 2007

(51) Int. Cl.
*G01S 15/89* (2006.01)

(52) U.S. Cl. .......................... 367/91; 367/90
(58) Field of Classification Search .............. 367/87–91
See application file for complete search history.

(56) References Cited

U.S. PATENT DOCUMENTS

| | | | |
|---|---|---|---|
| 3,795,893 A * | 3/1974 | Kritz et al. ..................... 367/91 |
| 4,065,745 A * | 12/1977 | Robinson ..................... 367/91 |
| 4,138,657 A | 2/1979 | Shave |
| 4,270,191 A | 5/1981 | Peynaud |
| 5,050,133 A | 9/1991 | Buddery |
| 5,077,700 A | 12/1991 | Shaw et al. |
| RE35,535 E | 6/1997 | Brumley et al. |
| 5,694,372 A | 12/1997 | Perennes |
| 5,808,967 A * | 9/1998 | Yu et al. ....................... 367/91 |
| 6,229,761 B1 | 5/2001 | Korolenko et al. |

* cited by examiner

*Primary Examiner*—Ian J Lobo
(74) *Attorney, Agent, or Firm*—James M. Kasischke; Michael P. Stanley; Jean-Paul A. Nasser

(57) ABSTRACT

A method is provided for improving horizontal spatial resolution of a flow field in compact jet-like current features so as to quantify the axial velocity in the cross section of a compact jet using an Acoustic Doppler Current Profiler (ADCP). The ADCP is a four-beam, Janus-type ADCP having beams aligned so that each of the beams is at an angle of about 20° to 30° to vertical and at 45° to the fore and aft axis of the vessel, such that two beams point at 45° to forward and two pointing 45° to aft. The measurements from each range bin of the aft-facing beams are combined with the previously measured samples from the corresponding forward-facing beams at the same position along the vessel track.

13 Claims, 5 Drawing Sheets

METHODS AND SYSTEMS FOR USE OF AN ACOUSTIC DOPPLER CURRENT PROFILER FOR MEASUREMENT OF COMPACT JETS

STATEMENT OF GOVERNMENT INTEREST

The invention described herein may be manufactured and used by or for the Government of the United States of America for Governmental purposes without the payment of any royalty thereon or therefore.

BACKGROUND OF THE INVENTION (1) Field of the Invention

The present invention relates to Doppler velocity measurements. More particularly, the present invention relates to Doppler current profiler methods and systems that combine measurements from different instances in time from a moving vehicle in order to establish measurements in the same measurement plane.

(2) Description of the Prior Art

It is known that acoustic Doppler current profilers (AD-CPs) are used to measure profiles of ocean currents. One common ADCP configuration is the so-called four-beam Janus configuration, having two pairs of opposed transducers. FIG. 1A illustrates a typical prior art ADCP 10 having four transducers 12. The transducers 12 are arranged such that opposing pairs of transducers are centered at 20° or 30° to the axis of the instrument and 40° or 60° to one another.

FIG. 1B is an illustration of a typical prior art deployment of the ADCP 10 from the bottom of a ship or vessel 14, with four acoustic beams 16 from the four transducers 12 projected downward each at an angle of 20° or 30° to vertical, so as to provide two forward directed beams and two aft directed beams.

Each of the acoustic beams 16 measures the Doppler shift of backscattered sound. If the sound-scattering particles move with the water, then the Doppler shift of the backscattered sound from each range cell will be proportional to the radial water velocity or the water velocity component in each range cell that is parallel to the acoustic beam. As used herein and shown in FIG. 1B, a range cell is a discrete volume, or cell, of water at which Doppler measurements are taken. As is known, the distance, or range, to the cell will be a function of the elapsed time from when the sound pulse beam leaves the ADCP to when the backscattered sound is received.

FIG. 1C illustrates the relationship between the acoustic beams 16 and an ocean current 18 for two of the four beams. As is known, the ADCP 10 sends sound pulses 20 from transducers 12 in a regular sequence, receives the backscattered sound 22 in each corresponding transducer, and computes a time series of radial velocity 24 for each beam from the Doppler shifts in a sequence of cells along the length of each beam using range gates.

When installed on a vessel, the beams are normally aligned so that each of the beams is at a small angle (usually $\phi=20°$-$30°$) to vertical and each is at 45° to the fore and aft axis of the vessel with two beams pointing at ±45° to forward and two pointing ±45° to aft. In the standard processing for the ADCP, radial velocity measurements from the four beams are combined using a trigonometric transformation to compute an orthogonal three-component velocity vector from the four non-orthogonal radial velocities. This procedure is repeated for each of the range cells to compute a time series of the velocity profiles of the two components of horizontal velocity and the vertical velocity.

Some ocean currents are known to be relatively compact or limited in horizontal extent in one direction but also relatively steady and coherent or slowly varying in the other horizontal direction. Such jet-like flows are commonly found in equatorial current systems and western boundary currents such as the Gulf Stream or tidal flows involving topographic features such as flows through straits or over sills. Although measurements from each of the four beams of the Janus ADCP are essentially simultaneous, each of the four beams measures water velocity at a different location in the horizontal plane because of the angular divergence of the acoustic beams. In the conventional configuration, the beam separation increases linearly with distance to the range cell. As a result of this divergence, horizontal variations in the orthogonal velocity components with length scales on the order of the beam separation or less cannot be resolved.

SUMMARY OF THE INVENTION

It is, therefore, a general purpose and a primary object of the invention to improve the horizontal spatial resolution of cross-track velocity measurements in a measurement plane perpendicular to the direction of vessel movement.

It is a further object of the present invention to use the improved cross-track velocity measurement to provide high-resolution descriptions of the flow field of compact jet-like current features in the measurement plane so as to quantify the distribution of axial velocity in the cross section of a compact jet using an ADCP.

These and other objects of the present invention are accomplished by providing a four-beam, Janus-type ADCP, wherein the measurements from each range bin of the aft-facing beams is combined with the previously-measured sample from the corresponding forward-facing beams at the same geographic position along the vessel track.

In one embodiment, a method of measuring compact jet flow fields in a medium includes moving an energy beam pulse generator through the medium along a path at a velocity, generating forward-facing energy beam pulses and aft-facing energy beam pulses, measuring Doppler shift readings for backscattered energy from the forward-facing energy beam pulses and the aft-facing energy beam pulses at range cells along the path combining, for each range cell, a first Doppler shift reading from a forward-facing energy beam pulse and a second Doppler shift reading from an aft-facing energy beam pulse, the second Doppler shift reading being taken at a time delay equal to a distance divided by the velocity, the distance being taken at any one time as that between the forward-facing energy beam pulse and the aft-facing energy beam pulse along a line parallel to the path and passing through the range cell.

In one aspect of the present invention, the method includes performing coordinate transformations to convert the combined Doppler shift readings into orthogonal velocities, which include a velocity component along the path. The forward-facing energy beam pulses and the aft-facing energy beam pulses may be generated at 90° to one another and pairs of forward-facing energy beam pulses and pairs of aft-facing energy beam pulses may be generated at angles between 20° and 30° degrees from vertical. The distance may be determined by the relationship:

$$\Delta x_i = 2R_i \sin\phi \cos 45°, \qquad (1)$$

where R is a range from the generator to the $i^{th}$ range cell and $\phi$ is the angle between the energy beam pulse and vertical. The medium may be water and the energy beam pulses may be acoustic, or the energy pulses may be electromagnetic in any electromagnetically transparent medium.

In another aspect of the present invention, the method includes generating the forward-facing energy beam pulses and the aft-facing energy beam pulses at 90° to one another.

In yet another aspect of the present invention, the method includes generating pairs of forward-facing energy beam pulses and pairs of aft-facing energy beam pulses, the pairs being generated at angles between 20° and 30° degrees from vertical. The forward-facing energy beam pulses and the aft-facing energy beam pulses may be at 90° to one another and the distance may be determined by the relationship:

$$\Delta x = 2R \sin \phi \cos 45°, \quad (2)$$

where R is a range from the generator to the range cell and $\phi$ is the angle between the energy beam pulse and the vertical.

In one embodiment of the present invention, a method for obtaining descriptions of a flow field in compact jet-like current features includes providing a Janus-type acoustic Doppler current profiler, generating a forward-facing acoustic beam from the profiler, obtaining first Doppler shift readings for a range cell of interest that is in a vertical measurement plane for a distance $\Delta x/2$ from the profiler, moving the profiler at a speed U in a direction perpendicular to and toward the measurement plane, at a later time $\Delta t = \Delta x/U$, generating an aft-facing beam from the profiler, obtaining second Doppler shift readings in the measurement plane for the range cell of interest and combining the first and second Doppler shift readings to obtain orthogonal velocity components in the measurement plane and perpendicular to the measurement plane.

In one aspect of the present invention, the method includes converting the first and second Doppler shift readings to radial velocities along the beams and performing coordinate transformations to convert the radial velocities into the orthogonal velocity components.

In another aspect of the present invention, the method includes generating pairs of forward-facing acoustic beams and pairs of aft-facing acoustic beams at angles between 20° and 30° degrees from vertical and generating the forward-facing acoustic beams and the aft-facing acoustic beams at 90° to one another. The distance may be determined by the relationship:

$$\Delta x = 2R \sin \phi \cos 45°, \quad (3)$$

where R is a range from the profiler to the range cell of interest and $\phi$ is the angle between the acoustic beams and the vertical.

BRIEF DESCRIPTION OF THE DRAWINGS

A more complete understanding of the invention and many of the attendant advantages thereto will be readily appreciated as the same becomes better understood by reference to the following detailed description when considered in conjunction with the accompanying drawings wherein.

DETAIL DESCRIPTION OF THE INVENTION

To provide an overall understanding, certain illustrative embodiments will now be described; however, it will be understood by one of ordinary skill in the art that the systems and methods described herein can be adapted and modified to provide systems and methods for other suitable applications and that other additions and modifications can be made without departing from the scope of the systems and methods described herein.

Unless otherwise specified, the illustrated embodiments can be understood as providing exemplary features of varying detail, and therefore, unless otherwise specified, features, components, modules, and/or aspects of the illustrations can be otherwise combined, separated, interchanged, and/or rearranged without departing from the disclosed systems or methods. Additionally, the shapes and sizes of components and the order of actions, steps and/or blocks shown in the diagrams are also exemplary and unless otherwise specified, can be altered without affecting the disclosed systems or methods.

Figure 1A:
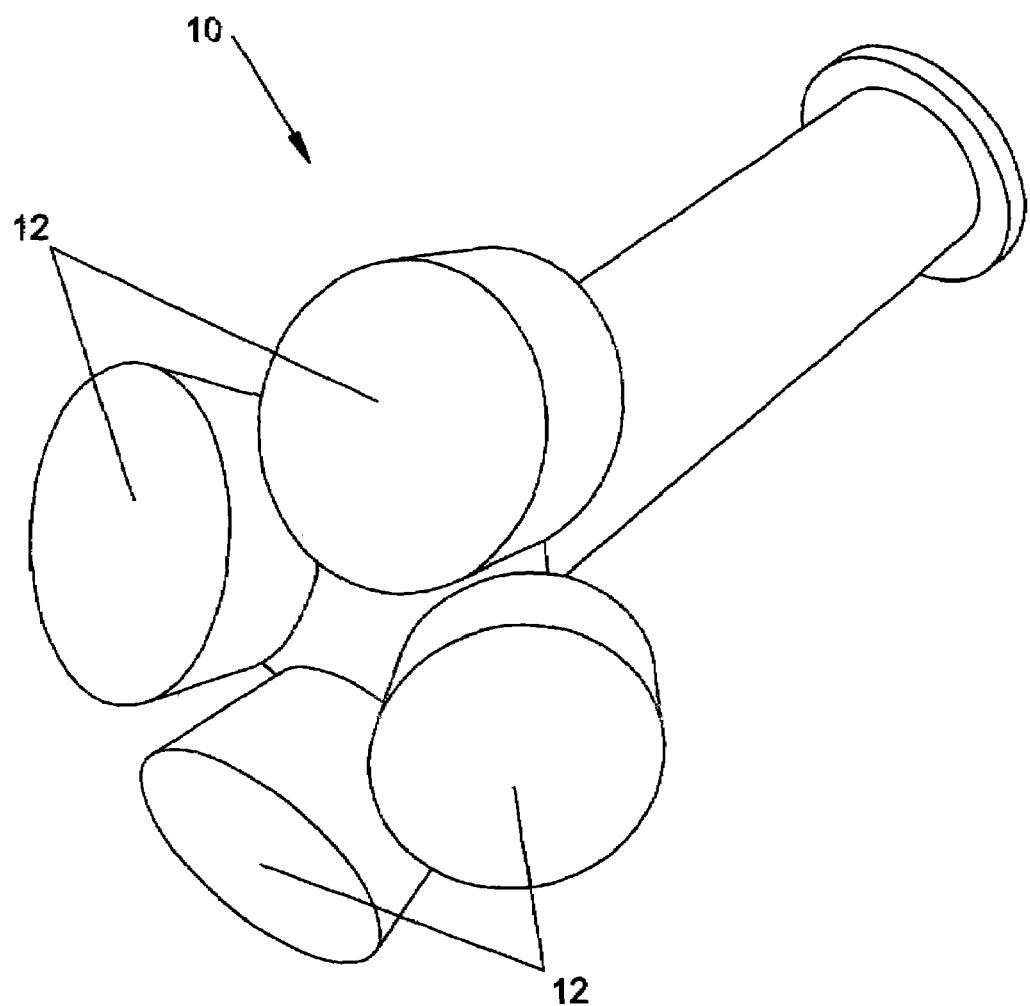
FIG. 1A illustrates a prior art acoustic Doppler current profiles (ADCP)
Figure 1B:
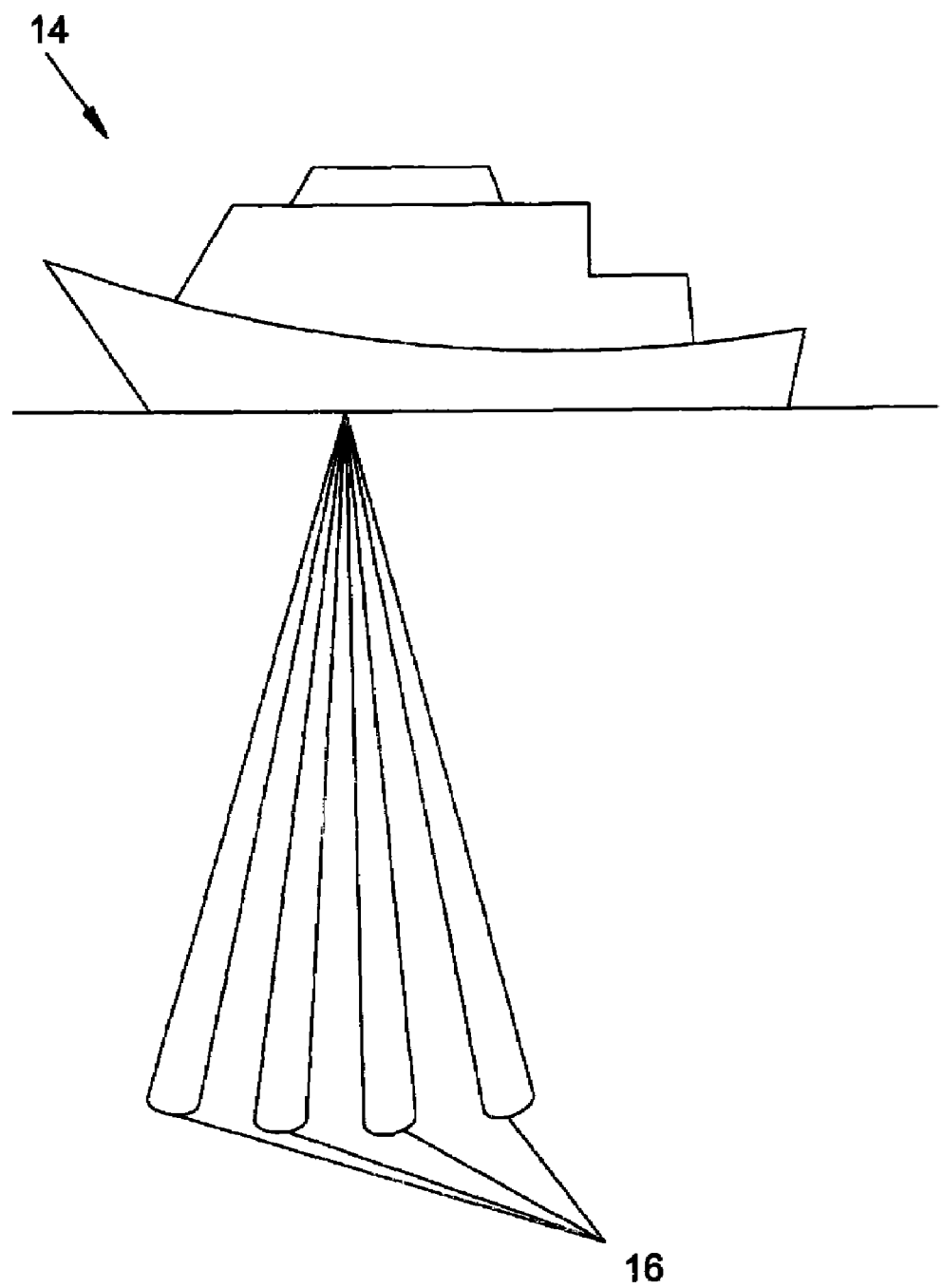
FIG. 1B illustrates the prior art ADCP of FIG. 1A deployed on the bottom of a ship or vessel.
Figure 1C:
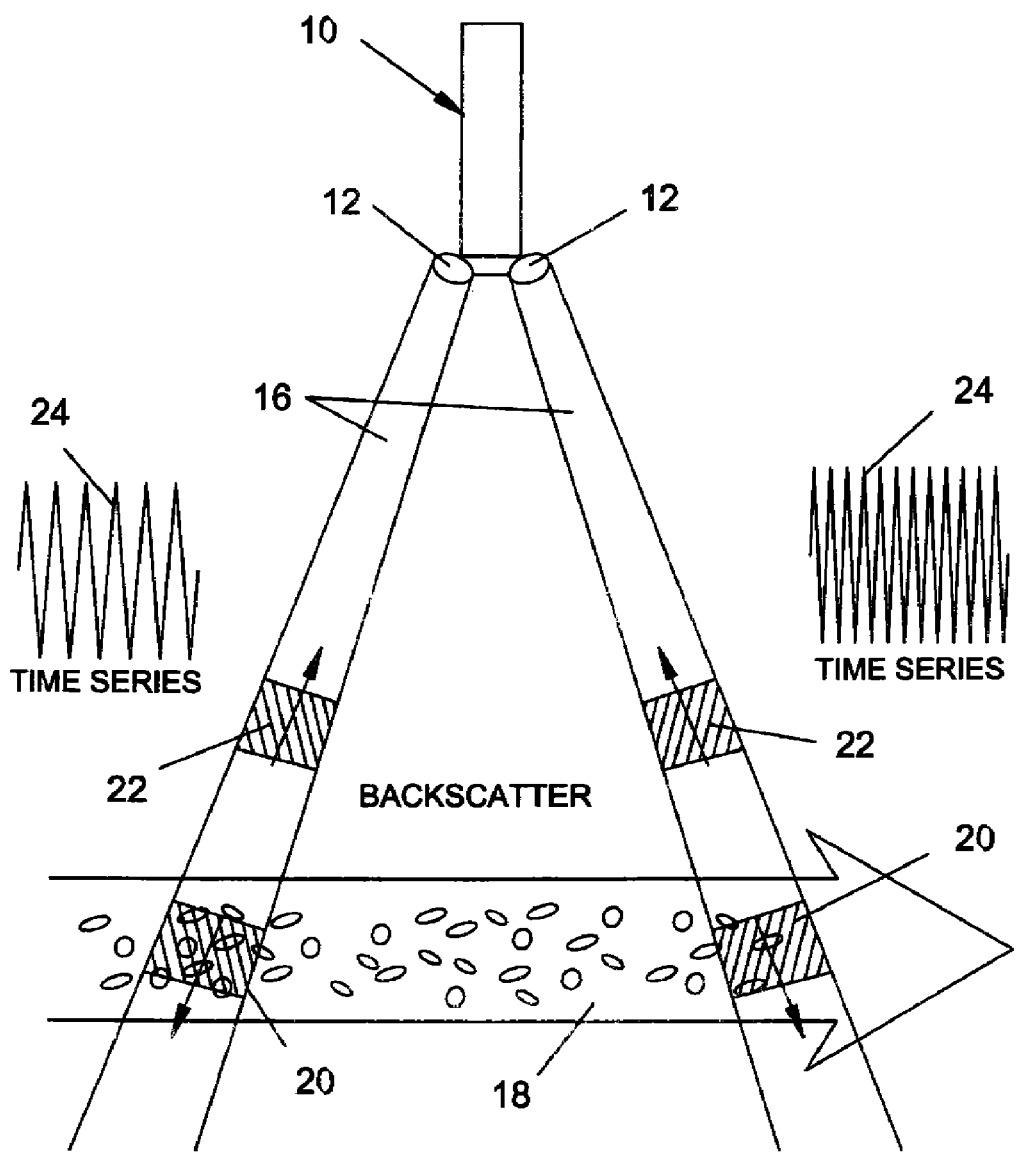
FIG. 1C is a prior art view illustrating known relationships between acoustic beams and ocean currents.
Figure 2:
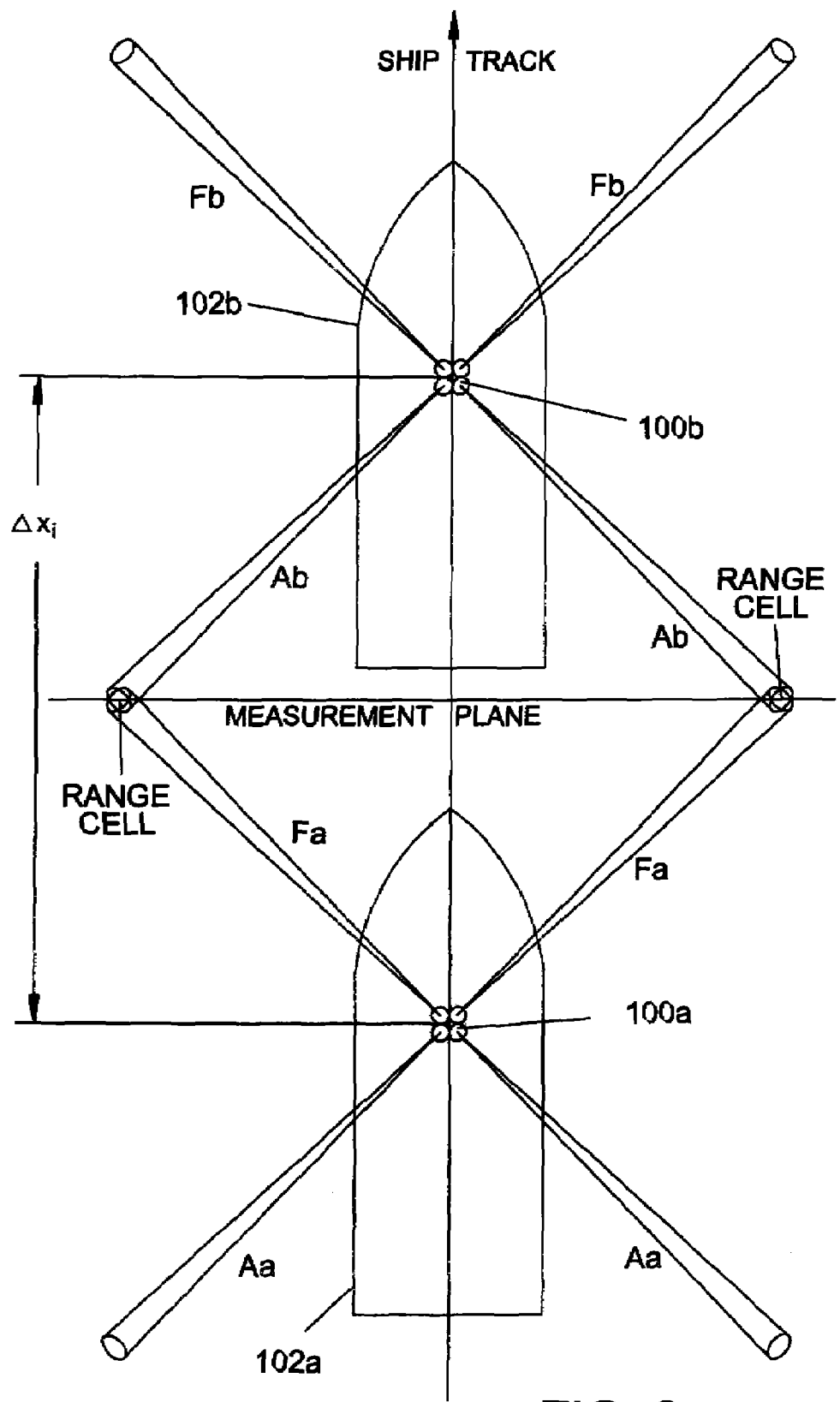
FIG. 2 depicts an illustration of a vessel taking ADCP measurements at two positions along a movement track.

Referring now to FIG. 2, there is shown an illustration of an acoustic Doppler Current Profiler (ADCP) system 100 mounted on a vessel 102 and taking measurements at two positions "a" and "b" along movement track 104 of a vessel 102. For ease of reference, position "a" on the left of the track 104 as shown in FIG. 2 will have reference numbers denoted with an "a", while position "b" on the right of the track 104 will have reference numbers denoted with a "b". It will be understood that vessel 102a, 102b illustrate the same vessel at different times along the track 104 and accordingly vessel 102b is indicated in phantom.

For the direction of motion illustrated by the arrow of track 104, position "a" will be before position "b" in time. At each position, four acoustic beams from ADCP system 100 are used to obtain velocity measurements. For additional ease of reference, the aft-facing acoustic beams are denoted as Aa, Ab, respectively, and forward facing beams are denoted Fa, Fb, respectively. For illustrative purposes and ease of reference, vessel 102 is illustrated in FIG. 2 in the shape of a marine vessel and system 100 is described as using acoustic beams. However, it may be understood that vessel 102 may be any type of vessel traveling through a medium and that other than acoustic beams may be used.

In certain specific applications, it is desirable to obtain descriptions of the flow field in compact jet-like current features. Current ADCP systems lack the horizontal spatial resolution needed to adequately describe such features. The limitation on horizontal resolution of current ADCP systems can be overcome by combining measurements from the four beams from the same location rather than from the same time. If one navigates the vessel with the ADCP to traverse these compact jets in the direction perpendicular to the principle flow direction, one may better resolve the cross section of these features using beam combinations from collocated beam measurements. The forward-facing beams are separated from the aft-facing beams by a distance along the vessel's track $\Delta x_i$ for the $i^{th}$ range cell:

$$\Delta x_i = 2R_i \sin \phi \cos \alpha, \quad (4)$$

where $R_i$ is the slant range to the $i^{th}$ range cell and $\phi$ is the angle between the acoustic beam and vertical. In equation (4), $\alpha$ denotes the angle between the forward and aft facing beams. For a Janus-type ADCP in the orientation shown in the figure, $\alpha = 45°$. For illustrative purposes, the remaining equations will assume the use of the Janus-type ADCP. However, it will be understood that the angle between the forward and aft facing beams may be varied.

For a vessel traveling on a straight track at speed U, the aft beams will cross the same position along the vessel track later than the forward beams by a time difference:

$$\Delta t_i = \frac{\Delta x_i}{U} = \frac{2R_i \sin\phi \cos 45°}{U}. \quad (5)$$

Thus, to achieve a collocated velocity solution for the horizontal velocity in the direction perpendicular to the vessel track, the forward beams would be combined with the aft beams that were sampled $\Delta t_i$ later, with a different time lag for each range cell, using the coordinate transformation that converts the four radial velocities into three orthogonal velocities. This processing scheme improves the horizontal resolution of jet-like features in the ocean under the conditions described above.

Figure 3:
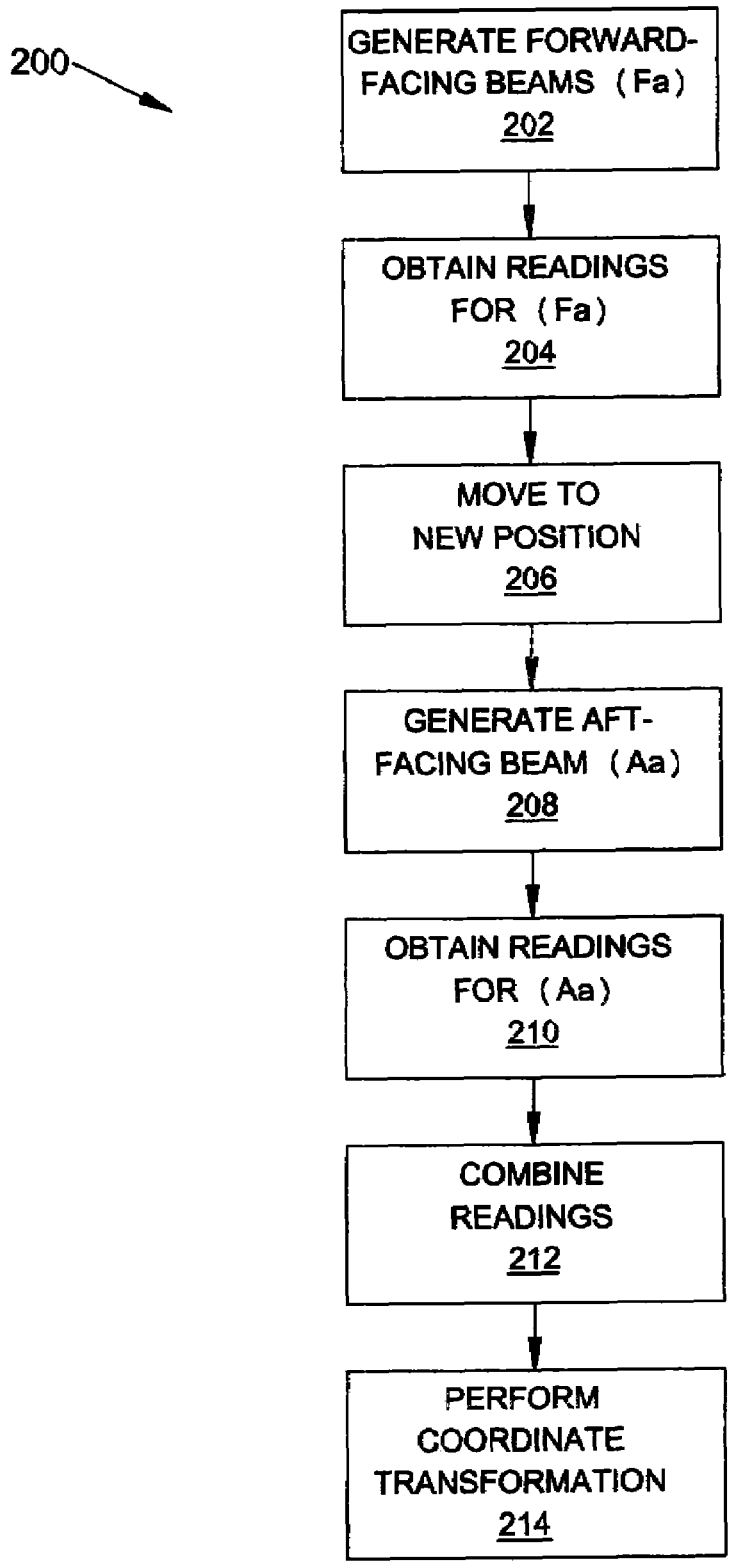
FIG. 3 is a block diagram of a method for providing high-resolution descriptions of the flow field in compact jet-like current features using ADCP measurements.

FIG. 3 is a block diagram illustrating the ADCP measurement method 200. With vessel 102a at the first position, ADCP 100a generates (202) forward-facing beams Fa and obtains Doppler shift readings (204) for Fa in the measurement plane for the particular range cell of interest. The vessel 102 moves to a new position (206) at a speed U in a direction perpendicular to the measurement plane, i.e., generally perpendicular to the principle flow direction of interest.

At a time $\Delta t_i = \Delta x_i/U$ later, with vessel 102b at the second position, ADCP 100b generates (208) aft-facing beams Ab and obtains Doppler shift readings (210) for Ab in the measurement plane for the same range cell of interest. The readings from the forward-facing beams Fa obtained at 206 are combined (212) with those from the aft-facing beams Ab obtained at 210. Using standard geometric relations for coordinate transformations, the four radial velocities are converted (214) into three orthogonal velocities, including velocities within the measurement plane and a velocity perpendicular to the measurement plane. For example, the velocity component perpendicular to the measurement plane Vp of a radial velocity Vr can be obtained by $$V_p = \frac{V_r}{\sin\phi \cos 45°}. \quad (6)$$

While a preferred embodiment of methods and systems obtaining high-resolution descriptions of a flow field in compact jet-like current features has been described in detail above, various modifications and variations are possible in light of the above teaching. As an example, the methods and systems may employ other than four beams and may be other than a Janus-type ADCP. Also, the method may be employed in obtaining descriptions of flow fields in other types of media, wherein other forms of energy beams besides acoustic beams may be used. For example, optical transducers generating light or laser beams may be preferred in measuring movement of pollutants in the atmosphere. It is therefore understood that within the scope of the appended claims the invention may be practiced otherwise and as described above.

What is claimed is:

1. A method of measuring flow fields in a medium, said method comprising the steps of:
    moving an energy beam pulse generator through the medium along a path at a velocity;
    generating forward-facing energy beam pulses and aft-facing energy beam pulses;
    measuring Doppler shift readings for backscattered energy from the forward-facing energy beam pulses and the aft-facing energy beam pulses at range cells along the path; and
    combining a first Doppler shift reading for each range cell from a forward-facing energy beam pulse and a second Doppler shift reading from an aft-facing energy beam pulse, the second Doppler shift reading being taken at a time delay equal to a distance divided by the velocity, the distance being taken at any one time as that between the forward-facing energy beam pulse and the aft-facing energy beam pulse along a line parallel to the path and passing through the range cell.

2. The method of claim 1, said method further comprising the step of performing coordinate transformations to convert the combined Doppler shift readings into orthogonal velocities, the orthogonal velocities including a velocity component along the path.

3. The method of claim 2, wherein said step of generating the forward-facing energy beam pulses and the aft-facing energy beam pulses comprises:
    generating the forward-facing energy beam pulses and the aft-facing energy beam pulses at 90° to one another; and
    generating pairs of forward-facing energy beam pulses and pairs of aft-facing energy beam pulses with the pairs being generated at angles between 20° and 30° degrees from vertical.

4. The method of claim 3, wherein the distance is determined by the relationship:

$\Delta x_i = 2R_i \sin\phi \cos 45°$, where

R is a range from the generator to the range cell and $\phi$ is the angle between the energy beam pulse and the vertical.

5. The method of claim 4, wherein the medium is water and the energy beam pulses are acoustic.

6. The method of claim 1, wherein said step of generating forward-facing energy beam pulses and aft-facing energy beam pulses comprises generating the forward-facing energy beam pulses and the aft-facing energy beam pulses at 90° to one another.

7. The method of claim 1, wherein said step of generating forward-facing energy beam pulses and aft-facing energy beam pulses comprises generating pairs of forward-facing energy beam pulses and pairs of aft-facing energy beam pulses, the pairs being generated at angles between 20° and 30° degrees from vertical.

8. The method of claim 7, wherein the forward-facing energy beam pulses and the aft-facing energy beam pulses are at 90° to one another, and wherein the distance is determined by the relationship:

$\Delta x = 2R \sin\phi \cos 45°$, where

R is a range from the generator to the range cell and $\phi$ is the angle between the energy beam pulse and the vertical.

9. The method of claim 1, wherein the medium is water and the energy beam pulses are acoustic.

10. A method for obtaining descriptions of a flow field in compact jet-like current features, comprising:
    providing a Janus-type acoustic Doppler current profiler;
    generating at least one forward-facing acoustic beam from the profiler;
    obtaining first Doppler shift readings for a range cell of interest with the range cell of interest being in a vertical measurement plane at a distance $\Delta x/2$ from the profiler;

moving the profiler at a speed U in a direction perpendicular to and toward the measurement plane;

generating at a time $\Delta t=\Delta x/U$ later at least one aft-facing beam from the profiler;

obtaining second Doppler shift readings in the measurement plane for the range cell of interest; and combining the first and second Doppler shift readings to obtain orthogonal velocity components in the measurement plane and perpendicular to the measurement plane.

11. The method of claim 10, wherein said step of obtaining comprises:

converting the first and second Doppler shift readings to radial velocities along the beams; and performing coordinate transformations to convert the radial velocities into the orthogonal velocity components.

12. The method of claim 10, said method comprising the further steps of:

generating the at least one forward-facing acoustic beam and the at least one aft-facing acoustic beam at 90° to one another; and generating pairs of forward-facing acoustic beams and pairs of aft-facing acoustic beams, the pairs being generated at angles between 20° and 30° degrees from vertical.

13. The method of claim 12, wherein the distance is determined by the relationship:

$\Delta x = 2R \sin \phi \cos 45°$, where

R is a range from the profiler to the range cell of interest and $\phi$ is the angle between the acoustic beams and the vertical.

* * * * *